(12) United States Patent
Maltese et al.

(10) Patent No.: US 9,285,657 B2
(45) Date of Patent: Mar. 15, 2016

(54) ARTICULATING ARM CAMERA MOUNT

(71) Applicants: Reno Makani Maltese, Redondo Beach, CA (US); Kenneth Craig Warren, Temecula, CA (US)

(72) Inventors: Reno Makani Maltese, Redondo Beach, CA (US); Kenneth Craig Warren, Temecula, CA (US)

(73) Assignee: Evoke Innovative Solutions, Inc., Carlsbad, CA (US)

( * ) Notice: Subject to any disclaimer, the term of this patent is extended or adjusted under 35 U.S.C. 154(b) by 0 days.

(21) Appl. No.: 14/217,464

(22) Filed: Mar. 17, 2014

(65) Prior Publication Data

US 2014/0270747 A1 Sep. 18, 2014

Related U.S. Application Data

(60) Provisional application No. 61/800,640, filed on Mar. 15, 2013.

(51) Int. Cl.
*G03B 17/00* (2006.01)
*G03B 17/56* (2006.01)
*F16M 11/10* (2006.01)
*F16M 11/20* (2006.01)
*F16M 13/00* (2006.01)

(52) U.S. Cl.
CPC ............ *G03B 17/561* (2013.01); *F16M 11/10* (2013.01); *F16M 11/105* (2013.01); *F16M 11/2064* (2013.01); *F16M 13/00* (2013.01); *Y10T 29/49826* (2015.01)

(58) Field of Classification Search
USPC ............... 396/419, 422, 427, 428; 248/185.1, 248/187.1; 348/375, 376
See application file for complete search history.

(56) References Cited

U.S. PATENT DOCUMENTS

| | | | |
|---|---|---|---|
| 5,649,256 A * | 7/1997 | Wen | 396/427 |
| 5,790,910 A | 8/1998 | Haskin | |
| 6,663,064 B1 | 12/2003 | Minelli | |
| 7,857,258 B2 | 12/2010 | Chiu | |
| 8,072,536 B1 * | 12/2011 | Campbell | 348/373 |
| 8,150,248 B1 | 4/2012 | Woodman | |
| 8,317,152 B1 * | 11/2012 | Zhou | 248/596 |
| 8,345,154 B2 * | 1/2013 | Zhan | 348/375 |
| 2002/0159773 A1 * | 10/2002 | Kodama et al. | 396/419 |
| 2010/0005636 A1 | 1/2010 | Liao | |
| 2012/0263451 A1 * | 10/2012 | Sechrist | 396/428 |
| 2013/0230308 A1 * | 9/2013 | Moody et al. | 396/419 |
| 2014/0312669 A1 * | 10/2014 | Zheng et al. | 297/354.1 |

OTHER PUBLICATIONS

Cineultima.com product website for 4pc Heavy Duty Super Clamp FR Studio Light Camera Mount, http://www.cineultima.com/useful-accessories/227-4pc-heavy-duty-super-clamp-fr-studio-light-camera-mount.html, accessed Feb. 27, 2013.

(Continued)

*Primary Examiner* — Clayton E Laballe
*Assistant Examiner* — Warren K Fenwick
(74) *Attorney, Agent, or Firm* — Sheppard Mullin Richter & Hampton, LLP

(57) ABSTRACT

Disclosed is an articulating arm camera mount for mounting an imaging device. The disclosed camera mount comprises a base, one or more arms, and a head that are movably secured to one another and are generally interchangeable with different components and pieces. The disclosed camera mount allows for greater flexibility and creativity in the placement and positioning of an imaging device.

23 Claims, 5 Drawing Sheets

(56) References Cited

OTHER PUBLICATIONS

Aliexpress.com product website for Car DVR Mount Holder, http://www.aliexpress.com/store/product/Car-DVR-Mount-Holder-Mini-3M-Double-Sided-Adhesive-Universal-Camera-Mount-Holder-Wholesale/505576_621198158.html, accessed Feb. 27, 2013.
Amazon.com product website for Fat Gecko Camera and Camcorder Mount, http://www.amazon.com/Fat-Gecko-Camera-Camcorder-Mount/dp/B0023ZK2TY, accessed Feb. 27, 2013.
Amazon.com product website for Scotty Portable Camera/Compass Mount, http://www.amazon.com/Scotty-Portable-Camera-Compass-Mount/dp/B0060UH3M2, accessed Feb. 27, 2013.
Opticsplanet.com product website for Manfrotto Bogen 2-section Articulated Arm w/ Camera Bracket, http://www.opticsplanet.com/manfrotto-bogen-2-section-single-articulated-arm-w-camera-bracket-143bkt.html, accessed Feb. 27, 2013.
Intova.com product website for Surf Board Mount, http://www.intova.net/products/surf-board-mount/, accessed Feb. 27, 2013.
International Search Report and Written Opinion for corresponding PCT Application No. PCT/US2014/030921, filed Mar. 17, 2014.

* cited by examiner

ARTICULATING ARM CAMERA MOUNT

CROSS-REFERENCE TO RELATED APPLICATIONS

This application claims the benefit of U.S. Provisional Application No. 61/800,640, filed Mar. 15, 2013, which is incorporated herein by reference as if fully set forth herein.

TECHNICAL FIELD

The present disclosure relates generally to imaging devices, and more particularly to an articulating arm camera mount for mounting an imaging device.

SUMMARY OF THE INVENTION

The present disclosure may be embodied in an imaging device mount comprising a base configured to be mounted on a receiving surface; an arm movably secured to the base such that the arm can be moved relative to the base and secured in place; and a mount head movably secured to the arm such that the mount head can be moved relative to the arm and secured in place. The mount head is configured to mount an imaging device. The imaging device mount may allow for multiple degrees of freedom for an imaging device mounted to the mount head.

In one embodiment, the arm may comprise a plurality of segments that are movably secured to each other to form the arm.

In one embodiment, the base may comprise an adhesive surface for mounting on a receiving surface. In another embodiment, the base may comprise a plug that is configured to be mounted in a corresponding cavity of a receiving surface. In yet another embodiment, the base may be configured to be removably secured to the receiving surface. In a further aspect of this embodiment, the base may comprise hook and loop fastener.

In one embodiment, the base may be shaped to be mounted on a flat receiving surface. In another embodiment, the base may be shaped to be mounted on a curved receiving surface. In yet another embodiment, the base may be shaped to be mounted on a non-flat surface.

In one embodiment, at least one of the arm or the mount head is movably secured using a threaded fastener such that when the threaded fastener is loosened, the arm and/or mount head is movable, and when the threaded fastener is tightened, the arm and/or mount head is secured in place.

In a particular embodiment, the mount head may be configured to mount a GoPro camera.

The present disclosure may also be embodied in a method comprising mounting an imaging device to a mount similar to the mount described above; securing the mount to a receiving surface; adjusting the position of the imaging device in a first direction by adjusting the position of the arm relative to the base; and adjusting the position of the imaging device in a second direction that is different from the first position by adjusting the position of the mount head relative to the arm; and locking the imaging device in place.

In one embodiment, the arm may comprise a plurality of segments that are movably secured to each other to form the arm.

In one embodiment, the base may comprise an adhesive surface for mounting on a receiving surface. In another embodiment, the base may be configured to be removably secured to a receiving surface. In a further aspect of this embodiment, the base may comprise hook and loop fastener.

In yet another embodiment, the base may comprise a plug that is configured to be mounted in a corresponding cavity of a receiving surface. In this embodiment, securing the mount to a receiving surface may comprise inserting the plug into the corresponding cavity and securing it within the cavity.

The base may be shaped to be mounted on a flat surface, a curved surface, or any other surface.

In one embodiment, at least one of the arm or the mount head is movably secured using a threaded fastener such that when the threaded fastener is loosened, the arm and/or mount head is movable, and when the threaded fastener is tightened, the arm and/or mount head is secured in place.

In a particular embodiment, the mount head may be configured to mount a GoPro camera.

In one aspect, adjusting the position of the imaging device in a first direction by adjusting the position of the arm relative to the base may comprise pivoting the arm relative to the base, and/or may comprise rotating the arm relative to the base. Similarly, adjusting the position of the imaging device in a second direction by adjusting the position of the mount head relative to the arm may comprise pivoting the mount head relative to the arm and/or rotating the mount head relative to the arm.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

This disclosure is directed towards a multi-direction mount 10 for an imaging device. Compact, sturdy imaging devices, such as the GoPro line of cameras, have become extremely popular, allowing users to capture unique views and perspectives of their activities by strapping the camera to their helmet or other equipment. However, the mounts available for these types of cameras have been fairly limited, and have not allowed for the degree of creativity and freedom of movement that is achievable with these compact imaging devices.

Figure 1:
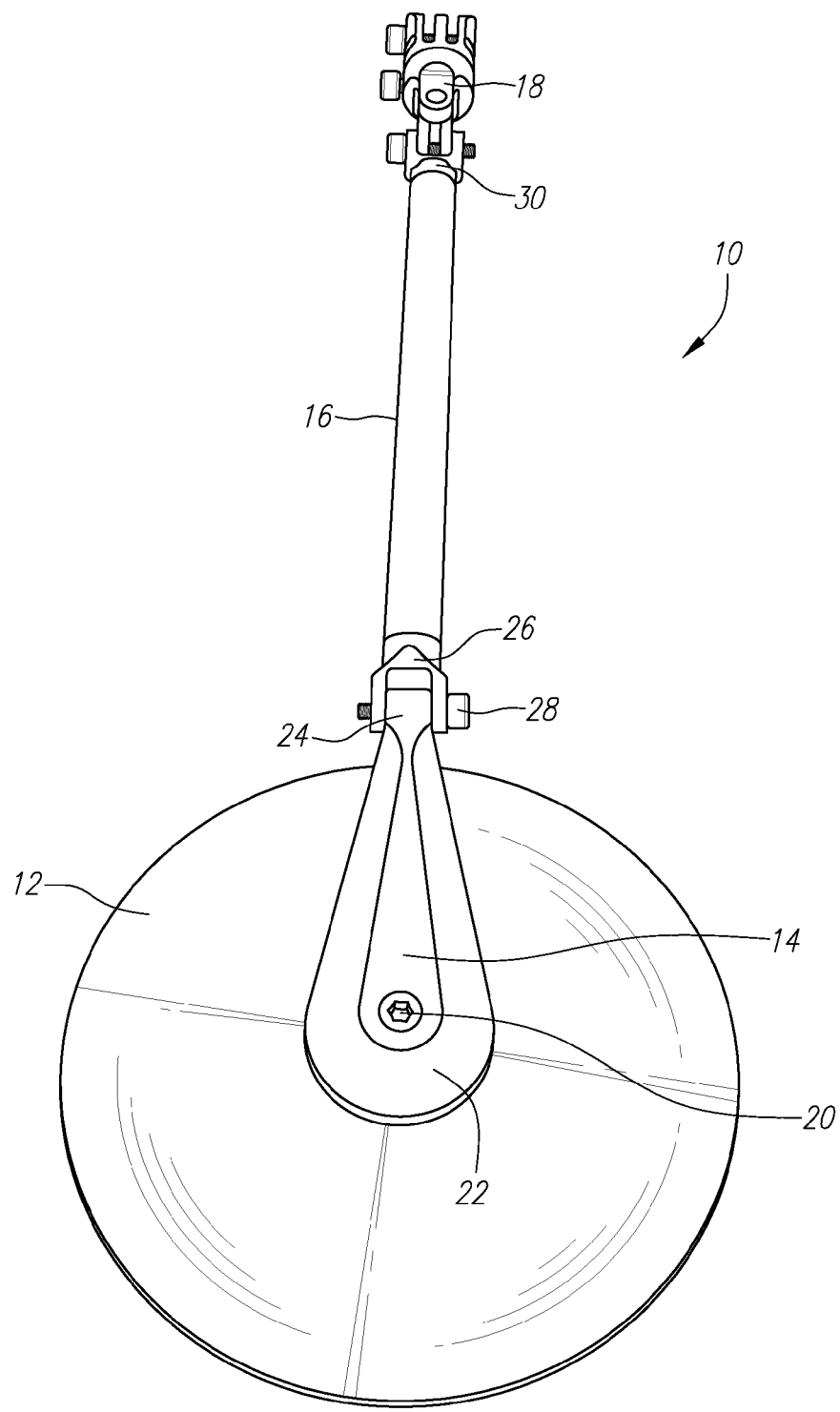
FIG. 1 is a perspective view of an articulating arm camera mount in accordance with an embodiment of the present disclosure.

The mount 10 shown in FIG. 1 allows for a camera to be positioned in many different positions by providing pivot points that allow for multiple degrees of freedom. The mount comprises a base 12, a base arm 14, a pivot arm 16, and a head 18. Preferably, all materials used to make the described pieces are made of durable, sturdy materials. In a further preferred embodiment, weather- and water-resistant materials would be used. It has been found that aircraft grade aluminum is suitable for many applications. The base 12, as depicted in FIG. 1, is a round, slightly conical shape on its top surface. On the top surface of the base, there is a threaded hole for receiving a screw 20. On the bottom surface of the base 12, there is a contact adhesive or other suitable substance or fastener (e.g., hook and loop fastener) for mounting the base on an object, such as a surfboard, a car dashboard or hood, a helmet, a skateboard, a snowboard, or any other suitable surface. While the base 12 shown in the figures has a flat bottom surface, the bottom surface of the base 12 may be shaped so as to conform to and adhere to a curved or non-flat surface. For example, a base meant to be mounted on a helmet might be curved to fit the shape of a helmet. Additionally, alternative mounting methods may be implemented aside from use of an adhesive. For example, the base 12 may be screwed onto a platform or other receiving surface, or may be shaped to be received in and mounted on a receiving surface.

The base arm 14 is connected to the base 12 using a screw 20 at a one end of the base arm 14, which we will refer to as the rotating end 22. In the figures, the screws used are allen screws. However, the screws may be of any type, such as a Philips screw, a flat-head screw, a hex head screw, or hand screws. Alternatively, other types of fasteners may be used to movably secure the different components. When the screw 20 is loosened, the base arm 14 may be rotated 360-degrees around the base. In this way, the base 12 may be affixed to a surface, rendering it immovable, but the base arm 14 is still able to turn 360 degrees and rotate the rest of the mount 10 in this way. Opposite the rotating end 22 of the base arm 14 is a "tang end" 24 which may have a reduced cross-section in comparison to the rotating end 22. The tang end 22 includes a cylindrical hole there through, similar to a clevis fastener tang. The tang end 24 of the base arm 14 is configured to fit into a "clevis end" 26 of the pivot arm 16, which is a U-shaped end with holes that line up with the cylindrical opening on the tang end 24 of the base arm 14.

Figure 2:
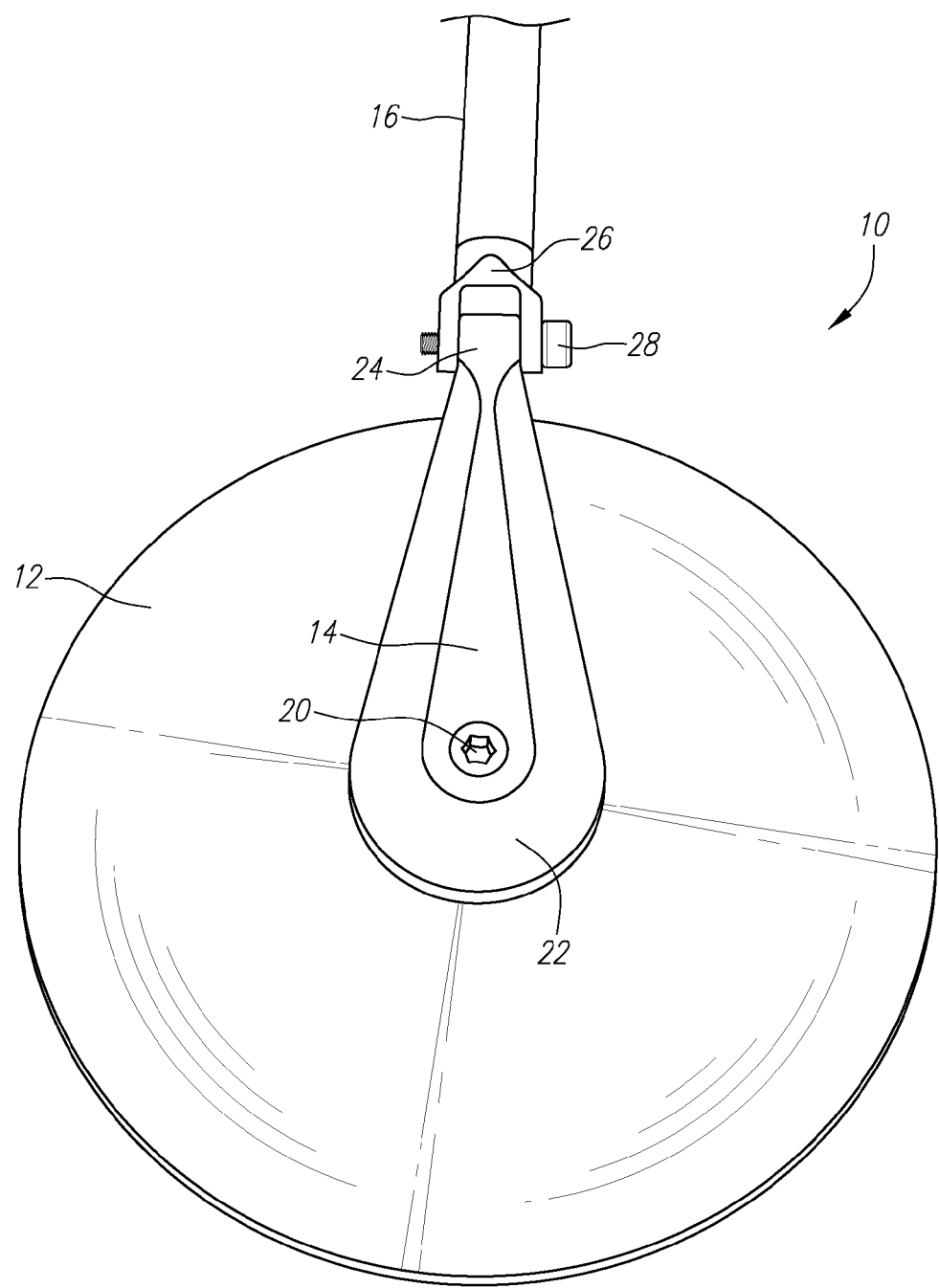
FIG. 2 is a close-up view of the base of the articulating arm camera mount of FIG. 1.
Figure 3:
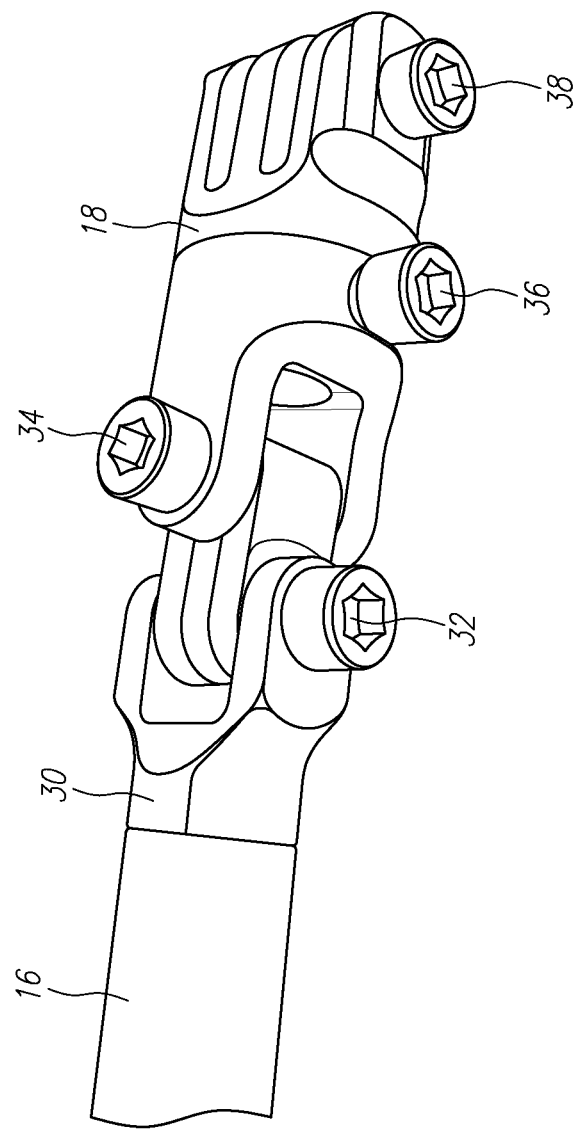
FIG. 3 is a close-up view of the mount head of the articulating arm camera mount of FIG. 1.

A close-up of the base 12, the base arm 14, and the base arm's connection to the pivot arm 16 is shown in FIG. 2. The base 12 is the large, circular piece. The base arm 14 is somewhat tear-like in shape, with the larger rotating end 22 secured to the base 12, and the narrow tang end 24 inserted into the clevis 26 of the pivot arm 16. By inserting the tang end 24 of the base arm 14 into the clevis end 26 of the pivot arm 16, the holes in the ends line up, which allows for a screw 28 to be passed through both the base arm 14 and the pivot arm 16, securing them together. When the screw 28 is fully tightened, the pivot arm 16 is tightly secured to the base arm 14 and is held in place. When the screw 28 is loosened, the pivot arm 16 is able to pivot in a direction perpendicular to the screw 28 (generally the vertical direction) to adjust the position of the camera. At the opposite end of the pivot arm 16, there is another clevis end 30 to receive the mount head 18, which is shown in FIG. 3.

The mount head 18, is the piece of the mount 10 that is configured to receive a camera or other imaging device. The head 18 shown in the figures is designed to receive a GoPro camera, but the head 18 may be configured to receive any kind of camera. FIG. 3 provides a close-up of the pivot arm's 16 connection to the mount head 18. Four screws are shown in the figure. The left-most screw 32 is the screw used to connect the pivot arm 16 to the mount head 18 in a clevis-fastener configuration. When the screw 32 is loosened, the head 18 is able to rotate on an axis perpendicular to the screw 32 (and parallel to the pivot arm 16). When the screw 32 is tightened, this joint is secured and does not move. The second screw from the left (34) controls the complementary joint that allows for movement in the perpendicular direction from the joint just described. As such, when this screw 34 is loosened, the camera head 18 is able to pivot in a direction perpendicular to the pivot arm 16. These two joints/screws 32, 34 allow for movement in perpendicular directions, which allows for significant flexibility in the positioning of the mounted camera.

The second screw from the right (36) controls rotation of the camera or other imaging device. When the screw 36 is loosened, the very top of the head 18 is able to rotate, up to 360°, thereby allowing for the camera to be rotated around the axis of base 37 and camera mount 39 of mount head 18. Tightening of the screw 36 locks the rotation of the camera relative to base 37. Finally, the rightmost screw 38 is used to secure the camera to the camera mount 39 of the mount head 18. Camera mount 39 in the present embodiment has a clevis-type configuration designed to mate with the typical mount provided on a GoPro camera case. In other embodiments, camera mount 39 may be provided with different configurations so as to properly mate with camera designs and/or camera cases provided by other manufacturers. Screw 38 is removed in order to allow a GoPro camera to be mounted to the camera mount 39. After the mount of the GoPro camera is properly aligned with the screw holes corresponding to screw 38, screw 38 may be reinserted and tightened. Until screw 38 is fully tightened, the camera may be tilted back and forth relative to camera mount 39. Tightening screw 38 fixes the camera with the desired amount of tilt.

While, in this particular embodiment, the mount head 18 is shown to be rotatable and pivotable relative to the pivot arm 16, the mount head may be fixedly attached to an extension that is then attached to the pivot arm 16 and is similarly pivotable and/or rotatable. It will be understood that, regardless of whether such an extension is considered to be part of the mount head 18 or a segment of the pivot arm 16, the principles of the present disclosure still apply by allowing the imaging device to be mounted on a platform and re-positioned with multiple degrees of freedom.

Figure 4:
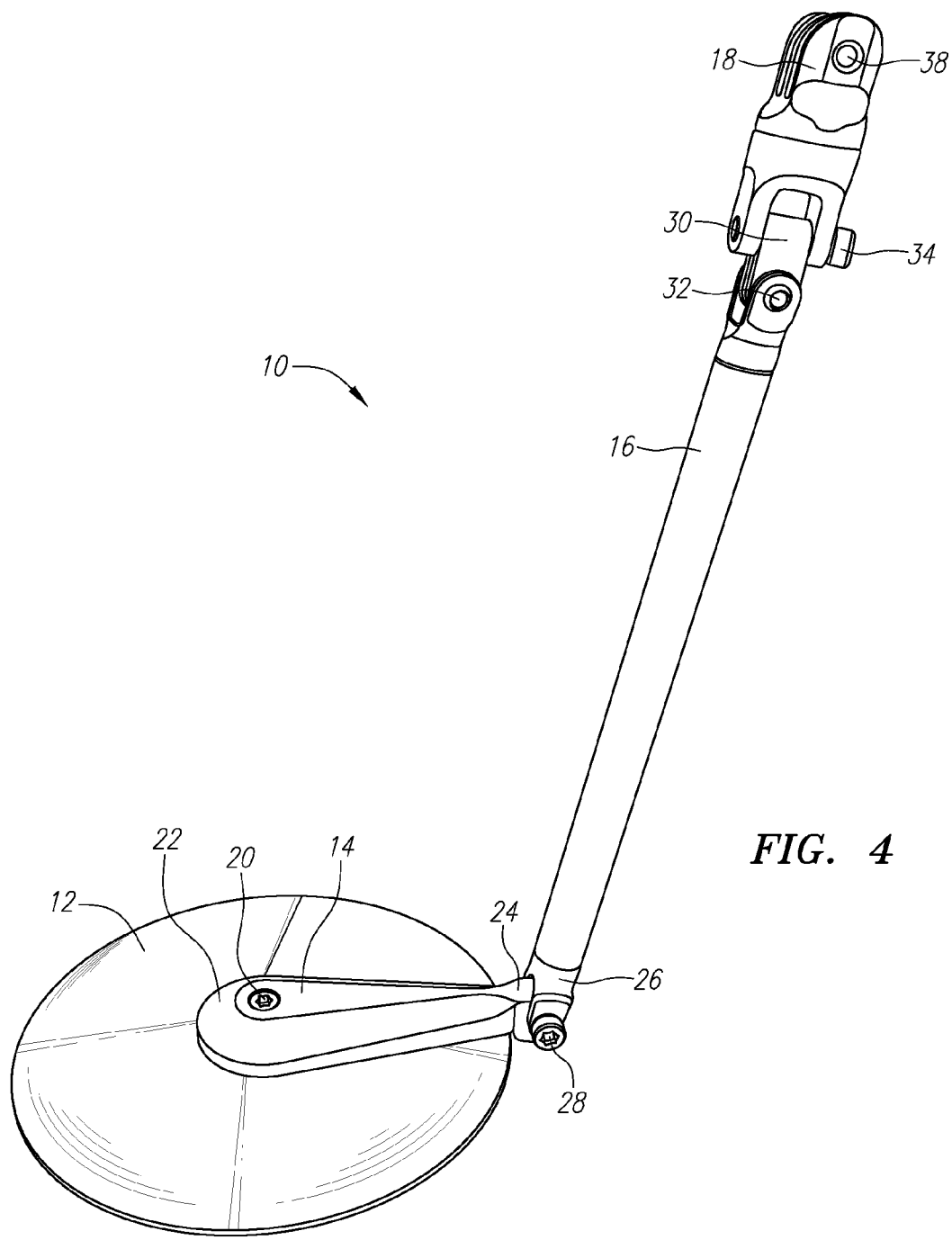
FIG. 4 is a perspective view of the articulating arm camera mount of FIG. 1.
Figure 5:
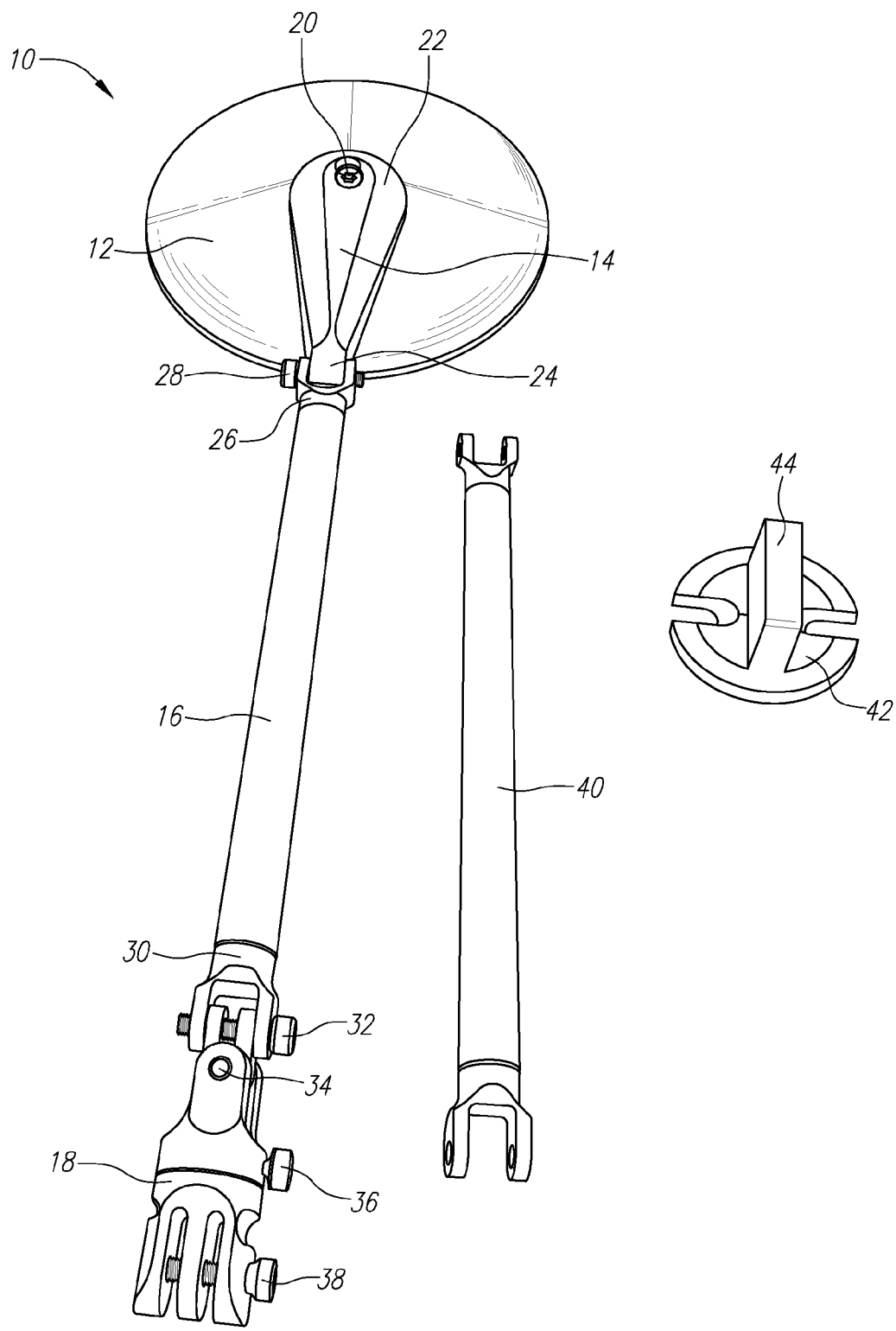
FIG. 5 is a perspective view of the articulating arm camera mount of FIG. 1 with additional accessories and components.

FIG. 4 shows the mount 10 with the base 12 lying flat horizontally, and the pivot arm 14 pivoted upwards. FIG. 5 shows the mount 10 fully assembled, and a separate pivot arm 40 directly to the right of the fully assembled mount 10. The pivot arm 16 may be removed from the mount 10 by unscrewing the screws 28, 32 at either end of the pivot arm 16, which connect it to the base arm 14 and the head 18. The removability of the pivot arm 16 allows for pivot arms 40 of different lengths and sizes to be changed in and out of the mount 10 to adjust the functionality of the mount. Additionally, multiple pivot arms may be chained together to provide additional points of movement and adjustment.

FIG. 5 demonstrates a modular aspect to the present disclosure. On the very right of FIG. 5 is an embedded plug 42 that, in some embodiments, may be used as the base 12. For example, the embedded plug configuration may be used to mount a camera on a surfboard or other sports board. Sports boards commonly have cavities or openings on their surfaces that allow for tethers or other accessories to be secured to the board. On one surface of the plug 42 shown in FIG. 5, there is an extension 44. The plug 42 and the extension 44 are shaped to fit into a board cavity. On the opposite surface of the plug 42 (not pictured) is a threaded hole that is able to receive a screw. This threaded hold can then be used to connect the base arm 14 to the embedded plug 42, rather than to an adhesive base 12, and the embedded plug 42 can then be used to secure the mount 10 to a surface such as a surf board. In accordance with the principles just described, in addition to the generally flat, adhesive base 12 shown in FIGS. 1-4, alternative bases may be used to secure the mount 10 to a surface, such as a curved adhesive base, or a base that is securable using another type of fastener (such as a hook and loop fastener), or the embedded plug 42 shown on the right in FIG. 5. The base 12 may also be replaced by a handle that can be held by a user or other type of base that can be otherwise secured. The base arm 14 can simply be unscrewed from one base and screwed into another to suit the situation.

The base arm 14 and the mount head 18 are also interchangeable and replaceable such that a user may change the radius or shape of the base arm 14 by replacing it with another, or may replace the mount head so as to be able to mount a different type of imaging device that uses a different mounting configuration. Further, the pivot arm 16 may be replace with another arm of a different length, or may be extended using multiple segments that are movably or immovably secured to one another. The general interchangeability and replaceability of the parts described herein allow numerous configurations and increased flexibility for the user to determine the best way to mount their imaging device.

Although the disclosure has been presented with reference only to the presently preferred embodiments, those of ordinary skill in the art will appreciate that various modifications can be made without departing from this disclosure.

The invention claimed is:

1. An imaging device mount for mounting an imaging device on a receiving surface, the mount comprising:
    a base configured to be removably secured to the receiving surface;
    an arm movably secured to the base such that the arm can be rotated relative to the base and secured in place; and
    a mount head movably secured to the arm such that the mount head can be moved relative to the arm and secured in place, the mount head configured to mount an imaging device, wherein
        the imaging device mount allows an imaging device mounted to the mount head to be adjusted with multiple degrees of freedom relative to the receiving surface.

2. The imaging device mount of claim 1, wherein the arm comprises a plurality of segments that are movably secured to each other to form the arm.

3. The imaging device mount of claim 1, wherein the base comprises an adhesive surface for removably securing to the receiving surface.

4. The imaging device mount of claim 1, wherein the base comprises a plug that is configured to be removably secured to a corresponding cavity formed in the receiving surface.

5. The imaging device mount of claim 1, wherein the base is shaped to be removably secured to a substantially flat receiving surface.

6. The imaging device mount of claim 1, wherein the base is shaped to be removably secured to a curved receiving surface.

7. The imaging device mount of claim 1, wherein the base comprises hook and loop fastener.

8. The imaging device mount of claim 1, wherein at least one of the arm and mount head is movably secured using a threaded fastener such that when the threaded fastener is loosened, the arm and/or mount head is movable, and when the threaded fastener is tightened, the arm and/or mount head is secured in place.

9. The imaging device mount of claim 1, wherein the mount head is configured to mount a GoPro camera.

10. A method comprising:
    mounting an imaging device to a mount, the mount comprising
        a base configured to be removably secured to a receiving surface,
        an arm rotatably secured to the base such that the arm can be rotated relative to the base and secured in place, and
        a mount head movably secured to the arm such that the mount head can be moved relative to the arm and secured in place, the mount head configured to mount an imaging device;
    securing the base to a receiving surface;
    adjusting the position of the imaging device in a first direction by adjusting the position of the arm relative to the base;
    adjusting the position of the imaging device in a second direction that is different from the first position by adjusting the position of the mount head relative to the arm; and
    locking the imaging device in place.

11. The method of claim 10, wherein the arm comprises a plurality of segments that are movably secured to each other to form the arm.

12. The method of claim 10, wherein the base comprises an adhesive surface for removably securing to a receiving surface.

13. The method of claim 10, wherein the base comprises a plug that is configured to be removably secured to a corresponding cavity formed in the receiving surface.

14. The method of claim 13, wherein securing the base to a receiving surface comprises inserting the plug into the cavity on the receiving surface and securing the plug within the cavity.

15. The method of claim 10, wherein the base is shaped to be secured to a substantially flat receiving surface.

16. The method of claim 10, wherein the base is shaped to be secured to a curved receiving surface.

17. The method of claim 10, wherein the base comprises hook and loop fastener.

18. The method of claim 10, wherein at least one of the arm and mount head is movably secured using a threaded fastener such that when the threaded fastener is loosened, the arm and/or mount head is movable, and when the threaded fastener is tightened, the arm and/or mount head is secured in place.

19. The method of claim 10, wherein the mount head is configured to mount a GoPro camera.

20. The method of claim 10, wherein adjusting the position of the imaging device in a first direction by adjusting the position of the arm relative to the base comprises pivoting the arm relative to the base.

21. The method of claim 10, wherein adjusting the position of the imaging device in a first direction by adjusting the position of the arm relative to the base comprises rotating the arm relative to the base.

22. The method of claim 10, wherein adjusting the position of the imaging device in a second direction that is different from the first direction by adjusting the position of the mount head relative to the arm comprises pivoting the mount head relative to the arm.

23. The method of claim 10, wherein adjusting the position of the imaging device in a second direction that is different from the first position by adjusting the position of the mount head relative to the arm comprises rotating the mount head relative to the arm.

* * * * *